(12) United States Patent
Bacon

(10) Patent No.: X5906
(45) Date of Patent: Apr. 7, 1830

(54) LOOM, CARPET & RUG

(76) Inventor: William Bacon

William Bacon

The Schedule referred to in these Letters Patent and
making part of the same containing a description
in the words of the said William Bacon himself
of his improvement in the machine for weaving rugs
and carpeting , Be it known that I William
Bacon of the City and County of Philadelphia and
State of Pennsylvania have invented an improvement
in the machine for weaving rugs & carpeting which
is described as follows. This machine consists of the
following parts, 1st the frame 2nd the beams 3rd the
top rail 4th the roller for the gears 5th the carriage
for the gears. 6th the Shuttles, 7th the pulleys for the reeds
and gears, 1st the frame is made of four pieces of scan-
tling about 4 by 5 inches thick and 7 feet long two
at each end. There are also two diagonal braces, one
at each end of the same thickness and about 5 feet long,
These last braces are connected and held together with
the first mentioned pieces by other smaller braces placed
near the bottom of the frame being all mortised and ten-
=oned together to form the frame, Two pieces which
brace the bottom of the frame serve also as carriage pieces
for the treadles to work on, to be hereafter described.
2nd The beams may be made of any length and thickness
to suit any sized carpet, In these beams are holes for
inserting a pin for turning them with pawls for keep-
ing them tight the same as weaver's beams,
3rd The top rail is placed near the top of the frame over
which the chain passes, It is made of any convenient
size according to the breadth of the loom, 4th the rol-
ler for the gears is 3 or 4 inches diameter and from
2 to 3 feet long for one person to work at, There may
be any number of rollers according to the size of the car-
pet pot and number of persons employed—
5th the carriages for the gears in which the rolling
work consists of four pieces two at each end for keep-
ing the gears in a proper direction, are made of one
inch boards about 5 inches wide and four feet long,
6th The Shuttles or needles are made similar to
common seine needles one for each colour and one
for the filling 7th The pullies for the reeds and gears
are five in number. two are placed on the top rail
two on the carriage of the gears for the treadles &
one on the bottom brace of the frame Operation.
The chain is put on the yarn beam in the usual way
over the top rail and thro' the gears and reeds from
thence extended by lines to the cloth beam, the treadles
are pressed down, which open the chain and the filling
put in by the needles one thread at once. the plush
is then put in by the proper needles one for each
colour and worked to any required figure,
For this purpose the figure is first divided into small
squares and the colours are then worked so as to corres-
pond with the squares. In this way a carpet of any
size with a border worked in can be made to fit any
room, without seam. and to suit the fire places
and different recesses of the room. Invention Claimed.
What I claim as my peculiar invention is the
construction of the before described Machine by which
rugs and carpets can be worked to any size and fig-
ure without seam and to fit any room. For
a further illustration of my invention I refer to the
model and drawings of the same deposited in the Patent
Office. In witness whereof I have subscribed my name
A. B. at the City of Washington this 19th day of February
[illegible] 1830. Witnesses, Wm P Elliot, Thos H. Davidson } William Bacon